United States Patent [19]
Min et al.

[11] Patent Number: 6,030,083
[45] Date of Patent: Feb. 29, 2000

[54] ARRAY OF THIN FILM ACTUATED MIRRORS FOR USE IN AN OPTICAL PROJECTION SYSTEM AND METHOD FOR THE MANUFACTURE THEREOF

[75] Inventors: Yong-Ki Min; Myoung-Jin Kim, both of Seoul, Rep. of Korea

[73] Assignee: Daewoo Electronics Co., Ltd., Seoul, Rep. of Korea

[21] Appl. No.: 09/150,773

[22] Filed: Sep. 10, 1998

Related U.S. Application Data

[62] Division of application No. 08/340,762, Nov. 16, 1994, Pat. No. 5,835,293.

[30] Foreign Application Priority Data

Nov. 16, 1993 [KR] Rep. of Korea ............ 93-24395
Nov. 16, 1993 [KR] Rep. of Korea ............ 93-24397
Dec. 30, 1993 [KR] Rep. of Korea ............ 93-31716

[51] Int. Cl.[7] ............... G02B 5/08; G02B 7/182
[52] U.S. Cl. ............... 359/846; 359/850; 359/872
[58] Field of Search ............ 359/846, 847, 359/848, 849, 850, 223, 224, 872; 204/192.15

[56] References Cited

U.S. PATENT DOCUMENTS

| | | |
|---|---|---|
| 1,985,424 | 12/1934 | Piggott . |
| 2,016,962 | 10/1935 | Flint et al. ............ 260/127 |
| 2,703,798 | 3/1955 | Schwartz ............ 554/66 |
| 2,920,529 | 1/1960 | Blythe ............ 88/73 |
| 3,544,201 | 12/1970 | Fowler et al. ............ 359/224 |
| 3,614,677 | 10/1971 | Wilfinger ............ 333/71 |
| 3,758,199 | 9/1973 | Thaxter . |
| 4,441,791 | 4/1984 | Hornbeck . |
| 4,518,976 | 5/1985 | Tasumi ............ 346/153.1 |
| 4,979,789 | 12/1990 | Um . |
| 5,022,745 | 6/1991 | Zayhowski et al. ............ 359/846 |
| 5,032,906 | 7/1991 | Um ............ 358/139 |
| 5,035,475 | 7/1991 | Lee ............ 359/212 |
| 5,085,497 | 2/1992 | Um ............ 359/848 |
| 5,126,836 | 6/1992 | Um ............ 310/328 |

(List continued on next page.)

FOREIGN PATENT DOCUMENTS

| | | |
|---|---|---|
| 0 419853 | 4/1991 | European Pat. Off. . |
| 9 109503 | 6/1991 | WIPO . |
| 9 308501 | 4/1993 | WIPO . |

*Primary Examiner*—Cassandra Spyrou
*Assistant Examiner*—Jared Treas
*Attorney, Agent, or Firm*—Pillsbury Madison & Sutro LLP

[57] ABSTRACT

An array of M×N thin film actuated mirrors for use in an optical projection system comprises an active matrix, an array of M×N thin film actuating structures, each of the thin film actuating structures being provided with a first and a second actuating parts, each of the first and second actuating parts including at least a thin film layer of a motion-inducing material, a pair of electrodes, each of the electrodes being provided on top and bottom of the motion-inducing thin film layer, an array of M×N supporting members, each of the supporting members being used for holding each of the actuating structures in place by cantilevering each of the actuating structures and also for electrically connecting each of the actuating structures and the active matrix, and an array of M×N mirror layers for reflecting light beams, each of the mirror layers further including a first side, a second opposing side and a center portion located therebetween, wherein the first side and the second opposited side of each of the mirror layers are secured on top of the first and second actuating parts of each of the actuating structures, respectively, such that when the first and second actuating parts in each of the actuating structures deform in response to an electrical signal applied between the first and second electrodes, the center portion of the corresponding mirror layer tilts while remaining planar, thereby allowing all of the center portion to reflect the light beams, resulting in an increased optical efficiency.

22 Claims, 15 Drawing Sheets

U.S. PATENT DOCUMENTS

| | | | |
|---|---|---|---|
| 5,138,309 | 8/1992 | Gonzalez et al. | 340/783 |
| 5,150,205 | 9/1992 | Um et al. | 358/60 |
| 5,159,225 | 10/1992 | Um | 348/721 |
| 5,185,660 | 2/1993 | Um | 358/60 |
| 5,209,119 | 5/1993 | Polla | 73/723 |
| 5,218,512 | 6/1993 | Nakamura | 361/321 |
| 5,245,369 | 9/1993 | Um et al. | 353/122 |
| 5,247,222 | 9/1993 | Engle | 310/328 |
| 5,260,798 | 11/1993 | Um et al. | 358/233 |
| 5,281,888 | 1/1994 | Takeuchi | 310/366 |
| 5,481,396 | 1/1996 | Ji et al. | 359/295 |

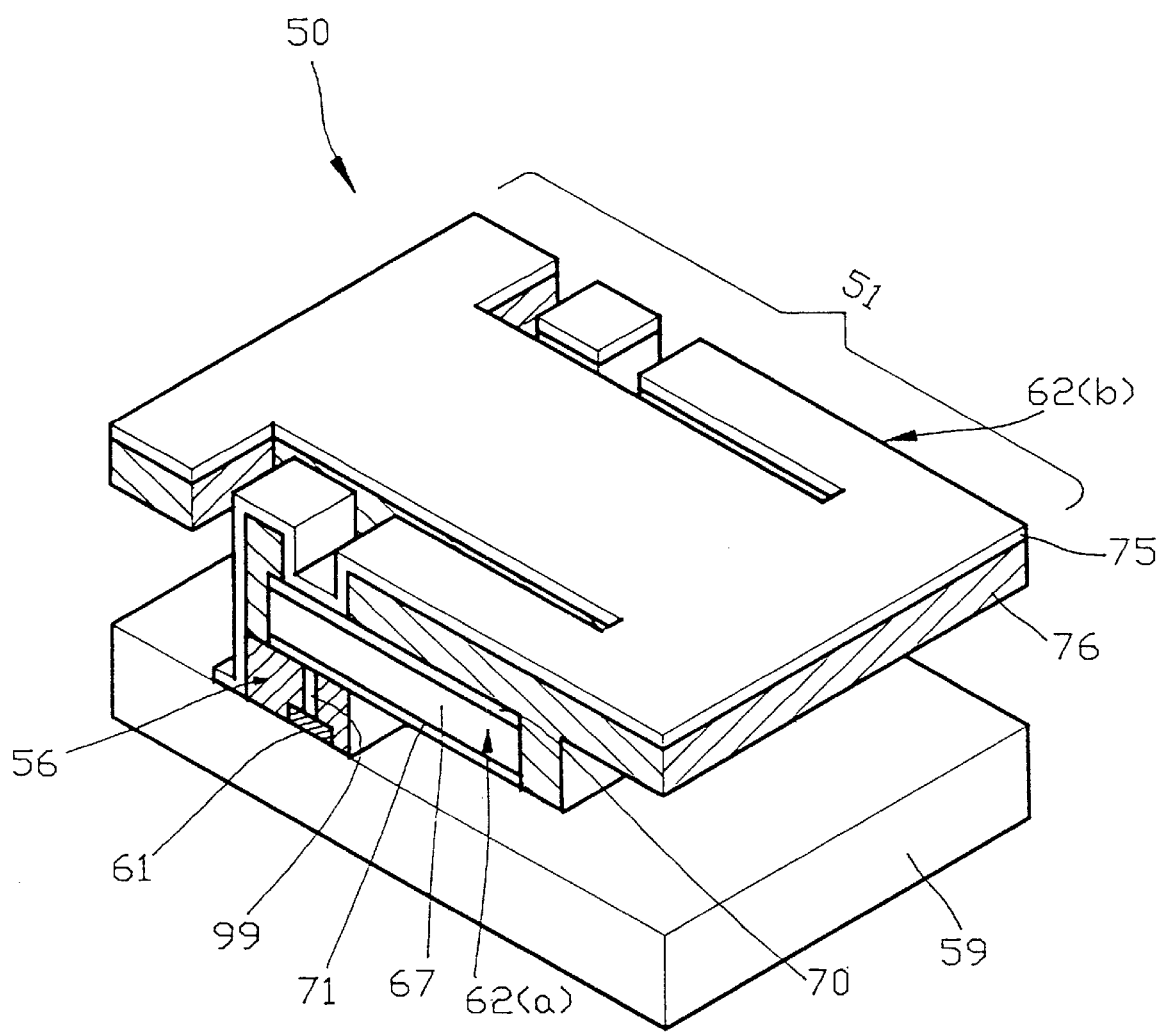

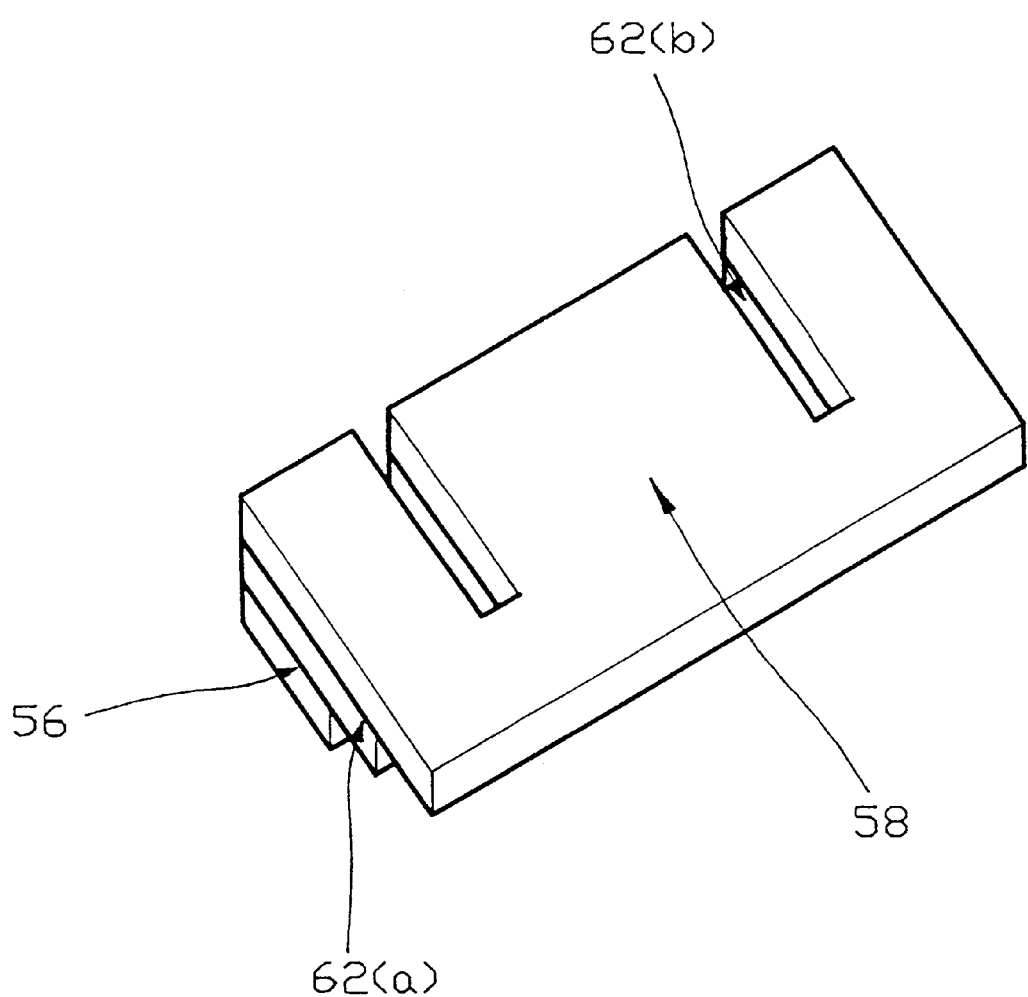

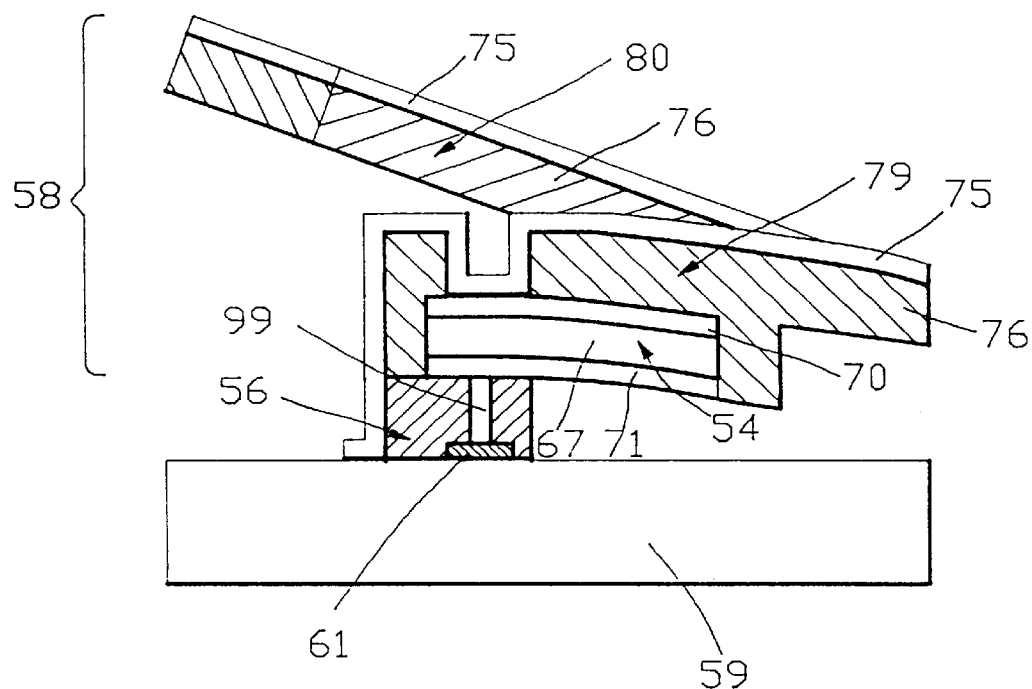
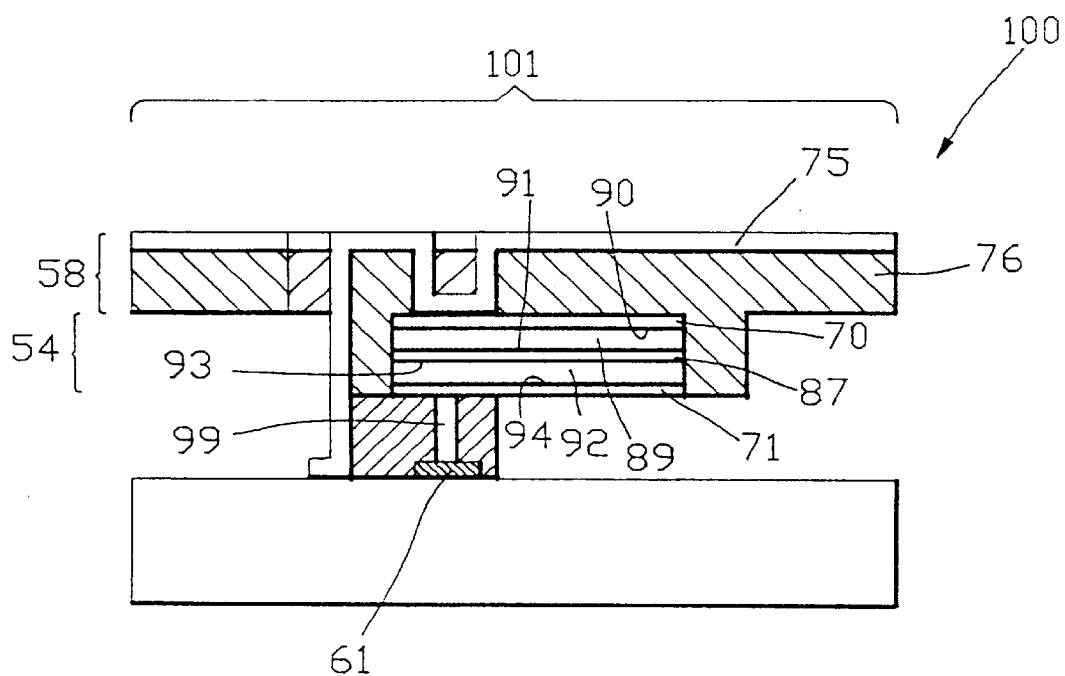

ARRAY OF THIN FILM ACTUATED MIRRORS FOR USE IN AN OPTICAL PROJECTION SYSTEM AND METHOD FOR THE MANUFACTURE THEREOF

This application is a divisional application of U.S. application Ser. No. 08/340,762, filed Nov. 16, 1994, now U.S. Pat. No. 5,835,293.

FIELD OF THE INVENTION

The present invention relates to an optical projection system; and, more particularly, to an array of M×N thin film actuated mirrors for use in the system and method for the manufacture thereof.

DESCRIPTION OF THE PRIOR ART

Among the various video display systems available in the art, an optical projection system is known to be capable of providing a high quality display in a large scale. In such an optical projection system, light from a lamp is uniformly illuminated onto an array of, e.g., M×N, actuated mirrors such that each of the mirrors is coupled with each of the actuators. The actuators may be made of an electrodisplacive material such as a piezoelectric or an electrostrictive material which deforms in response to an electric field applied thereto.

The reflected light beam from each of the mirrors is incident upon an aperture of a baffle. By applying an electrical signal to each of the actuators, the relative position of each of the mirrors to the incident light beam is altered, thereby causing a deviation in the optical path of the reflected beam from each of the mirrors. As the optical path of each of the reflected beams is varied, the amount of light reflected from each of the mirrors which passes through the aperture is changed, thereby modulating the intensity of the beam. The modulated beams through the aperture are transmitted onto a projection screen via an appropriate optical device such as a projection lens, to thereby display an image thereon.

In FIG. 1, there is shown a cross sectional view of an M×N electrodisplacive actuated mirror array 10 for use in an optical projection system, disclosed in a copending commonly owned application, U.S. Ser. No. 08/278,472, entitled "ELECTRODISPLACIVE ACTUATED MIRROR ARRAY, comprising: an active matrix 11 including a substrate 12 and an array of M×N transistors thereon; an array 13 of M×N electrodisplacive actuators 30, each of the electrodisplacive actuators 30 including a pair of actuating members 14, 15, a pair of bias electrodes 16, 17, and a common signal electrode 18; an array 19 of M×N hinges 31, each of the hinges 31 fitted in each of the electrodisplacive actuators 30; an array 20 of M×N connecting terminals 22, each of the connecting terminals 22 being used for electrically connecting each of the signal electrodes 18 with the active matrix 11; and an array 21 of M×N mirrors 23, each of the mirrors 23 being mounted on top of each of the M×N hinges 31.

There is a number of problems associated with the above described electrodisplacive actuated mirror array. First of all, since the electrodisplacive material making up the actuating members is in a bulk form, it will likely degrade after an extended use, which will in turn affect the performance of the actuated mirrors in the array. Furthermore, since each of the actuated mirrors is not separated from each other, electrically or physically, the action of each actuated mirror is affected by those of the neighboring actuated mirrors.

In the above mentioned copending, commonly owned application, there is also disclosed a method for manufacturing such an array of M×N electrodisplacive actuated mirrors, employing a ceramic wafer having a thickness of 30 to 50 μm.

There is room for further improvements over the above described method for manufacturing an array of M×N electrodisplacive actuators, however. First of all, it is rather difficult to obtain a ceramic wafer having a thickness of 30 to 50 μm; and, furthermore, once the thickness of the ceramic wafer is reduced to a 30 to 50 μm range, the mechanical properties thereof are likely to degrade which may, in turn, make it difficult to carry out the manufacturing process.

In addition, it involves a number of time consuming, hard to control, and tedious processes, thereby making it difficult to obtain the desired reproducibility, reliability and yield; and, furthermore, there may be a limit to the down sizing thereof.

SUMMARY OF THE INVENTION

It is, therefore, a primary object of the present invention is to provide a method for manufacturing an array of M×N actuated mirrors, which dispenses with the use of a thin electrodiplacive ceramic wafer.

It is another object of the present invention to provide an improved and novel method for manufacturing an array of M×N actuated mirrors which will give higher reproducibility, reliability and yield.

It is a further object of the present invention to provide an array of M×N actuated mirrors having a novel structure and capable of maintaining a performance integrity after an extended use.

It is a still another object of the present invention to provide an array of M×N actuated mirrors having an improved optical efficiency.

In accordance with one aspect of the present invention, there is provided an array of M×N thin film actuated mirrors for use in an optical projection system, the array comprising: an active matrix including a substrate, an array of M×N transistors and an array of M×N connecting terminals; an array of M×N thin film actuating structures, each of the actuating structures including a first and a second actuating parts, the first and second actuating parts being identically structured, each of the first and second actuating parts being provided with a top and a bottom surfaces, a proximal and a distal ends, each of the first and second actuating parts having at least a thin film layer of a motion-inducing material including a top and a bottom surfaces and a first and a second electrode with the first electrode being placed on the top surface of the motion-inducing thin film layer, and the second electrode, on the bottom surface of the motion-inducing thin film layer, wherein an electrical signal applied across the motion-inducing thin film layer between the first and second electrodes of each actuating part causes a deformation of the motion-inducing thin film layer, and hence the actuating part; an array of M×N supporting members, each of the supporting members being provided with a top and a bottom surfaces, wherein each of the supporting members is used for holding each of the actuating structures in place and also for electrically connecting each of the actuating structures with the active matrix; and an array of M×N mirror layers, each of the mirror layers including a mirror for reflecting light beams and a supporting layer, each of the mirror layers further including a first side, a second opposing side and a center portion located therebetween, wherein the first side and the second opposing side of each of the mirror layers are secured on top of the first and second actuating parts of each of the actuating structures, respectively, such that when the first and second actuating parts in each of the actuating structures deform in response to the electrical signal, the center portion of the corresponding mirror layer tilts while remaining planar, thereby allowing all of the center portion to reflect the light beams, resulting in an increased optical efficiency.

In accordance with another aspect of the present invention, there is provided a novel method for manufacturing an array of M×N actuated mirrors for use in an optical projection system, utilizing the known thin film techniques, the method comprising the steps of: (a) providing an active matrix having a top and a bottom surfaces, the active matrix including a substrate, an array of M×N transistors and an array of M×N connecting terminals; (b) forming a first supporting layer on the top surface of the active matrix, the first supporting layer including an array of M×N pedestals corresponding to the array of M×N supporting members in the array of M×N thin film actuated mirrors and a first sacrificial area; (c) treating the first sacrificial area of the first supporting layer to be removable; (d) depositing a first thin film electrode layer on the first supporting layer; (e) providing a thin film motion-inducing layer on the first thin film electrode layer; (f) forming a second thin film electrode layer on the thin film motion-inducing layer; (g)patterning the first thin film electrode layer, the thin film motion-inducing layer and the second thin film electrode layer into an array of M×N actuating structures and an empty area surrounding thereof, each of the actuating structures further including a first and a second actuating parts; (h) forming second sacrificial layer on the empty area surrounding each of the actuating structures; (i)treating the second sacrificial layer to be removable; (j) patterning the second sacrificial layer into an array of M×N sacrificial members; (k) depositing a second supporting layer on top of the array of M×N actuating structures and the second sacrificial layer patterned in the previous step; (l)depositing a light reflecting layer on top of the second supporting layer; (m) pattering the light reflecting layer and the second supporting layer into an array of M×N mirror layers; and (n) removing the first sacrificial areas and the array of M×N sacrificial members to thereby form said array of M×N thin film actuated mirrors.

BRIEF DESCRIPTION OF THE DRAWINGS

The above and other objects and features of the present invention will become apparent from the following description of preferred embodiments given in conjunction with the accompanying drawings, wherein:

FIG. 5 presents a detailed perspective view of the inventive thin film actuated mirror array of the first embodiment, shown in FIG. 2;

FIG. 6 offers another possible mirror layer configuration for the first embodiment;

FIG. 7 discloses a cross sectional view of a thin film actuated mirror of the first embodiment in an actuated state;

FIG. 8 provides a cross sectional view of a thin film actuated mirror of the second embodiment having a bimorph structure;

DETAILED DESCRIPTION OF THE PREFERRED EMBODIMENTS

Figure 1:
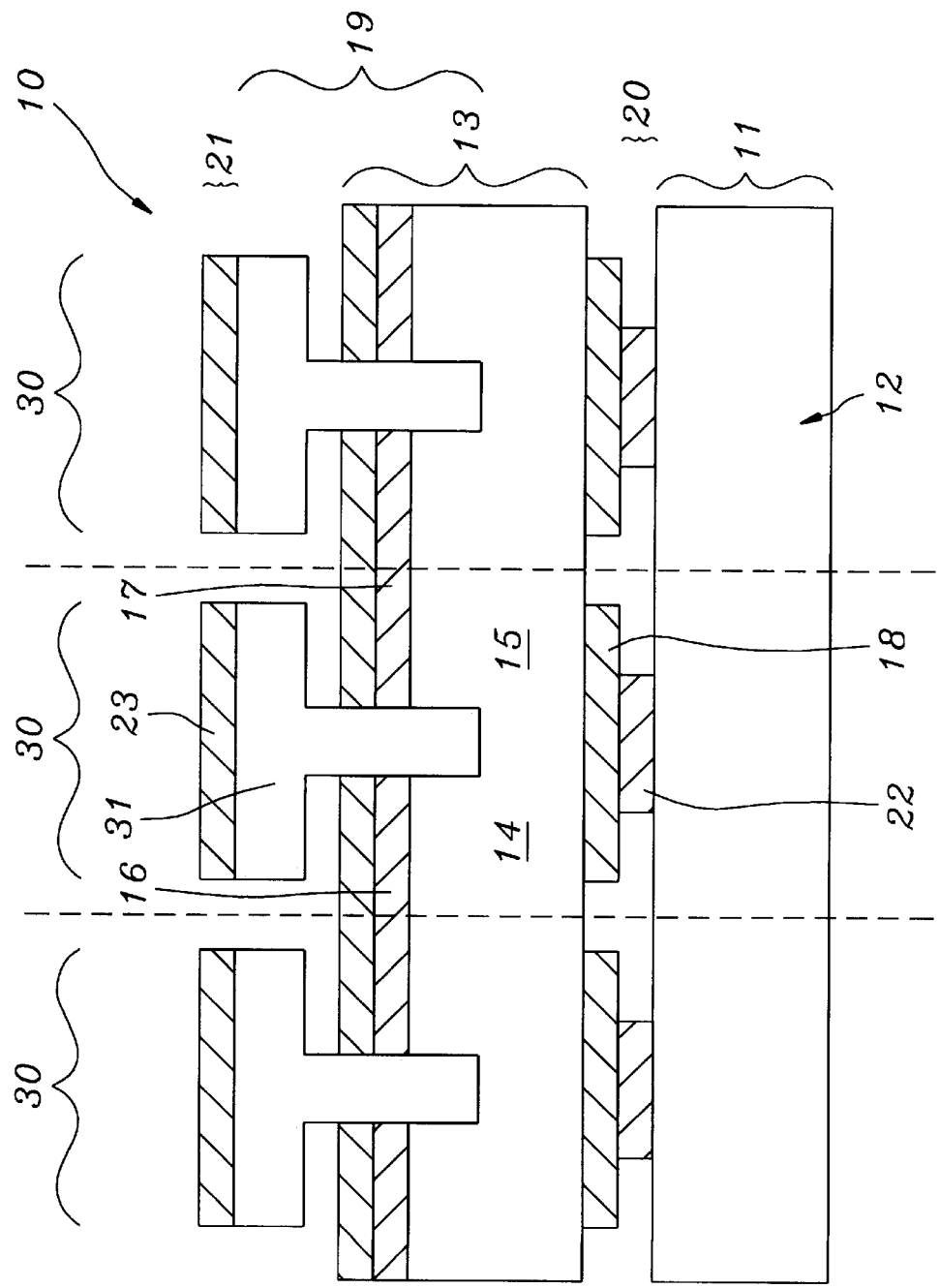
FIG. 1 shows a cross sectional view of an array of M×N electrodisplacive actuated mirrors previously disclosed.

Referring now to FIGS. 2 to 12, there are provided schematic cross sectional views of the inventive array of M×N thin film actuated mirrors for use in an optical projection system and method for the manufacture thereof, wherein M and N are integers, in accordance with preferred embodiments of the present invention. It should by noted that like parts appearing in FIGS. 2 to 12 are represented by like reference numerals.

Figure 2:
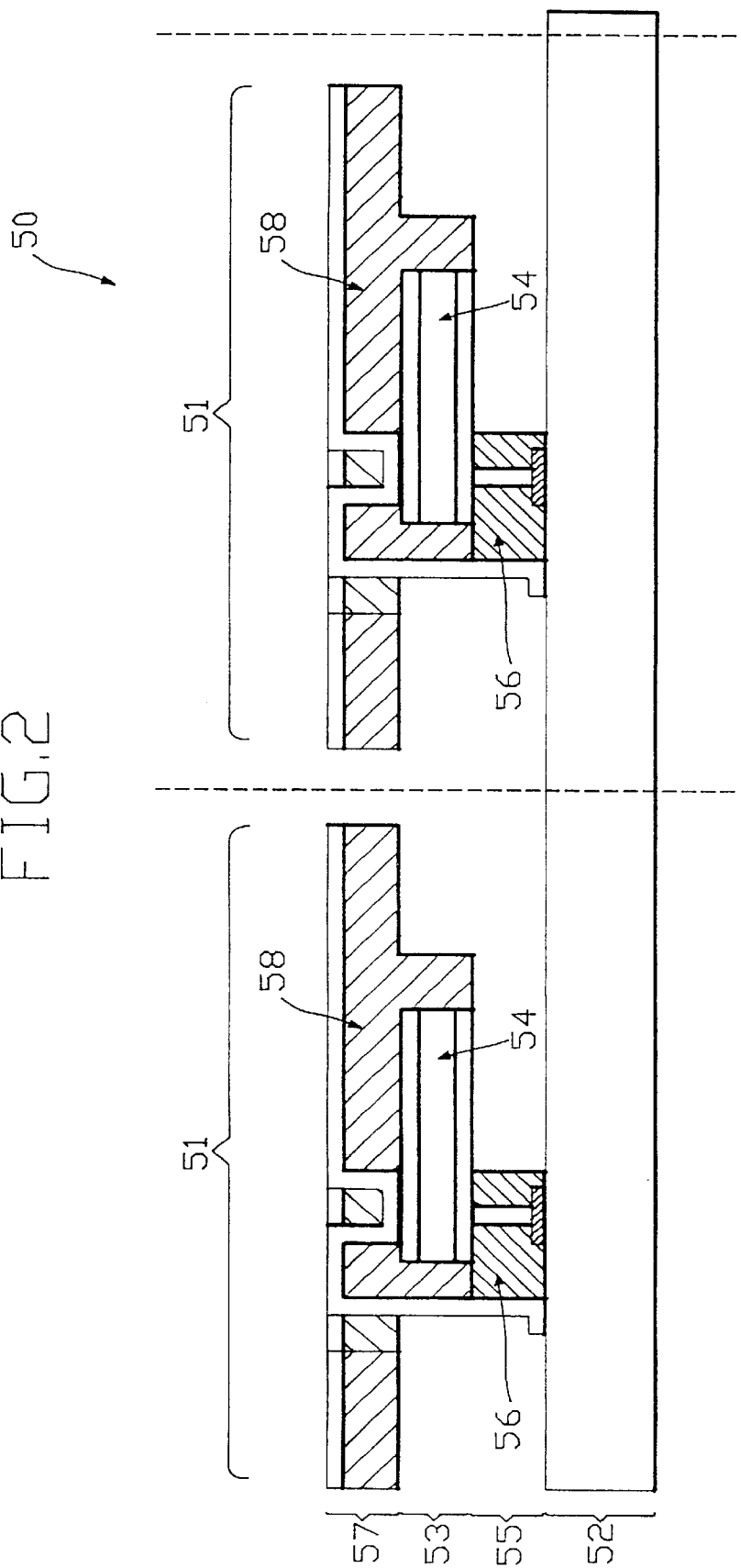
FIG. 2 represents a cross sectional view of M×N thin film actuated mirrors in accordance with the first preferred embodiment of the present invention.

In FIG. 2, there is illustrated a cross sectional view of a first embodiment of an array 50 of M×N thin film actuated mirrors 51, comprising an active matrix 52, an array 53 of M×N thin film actuating structures 54, an array 55 of M×N supporting members 56, and an array 57 of M×N mirror layers 58.

Figure 3:
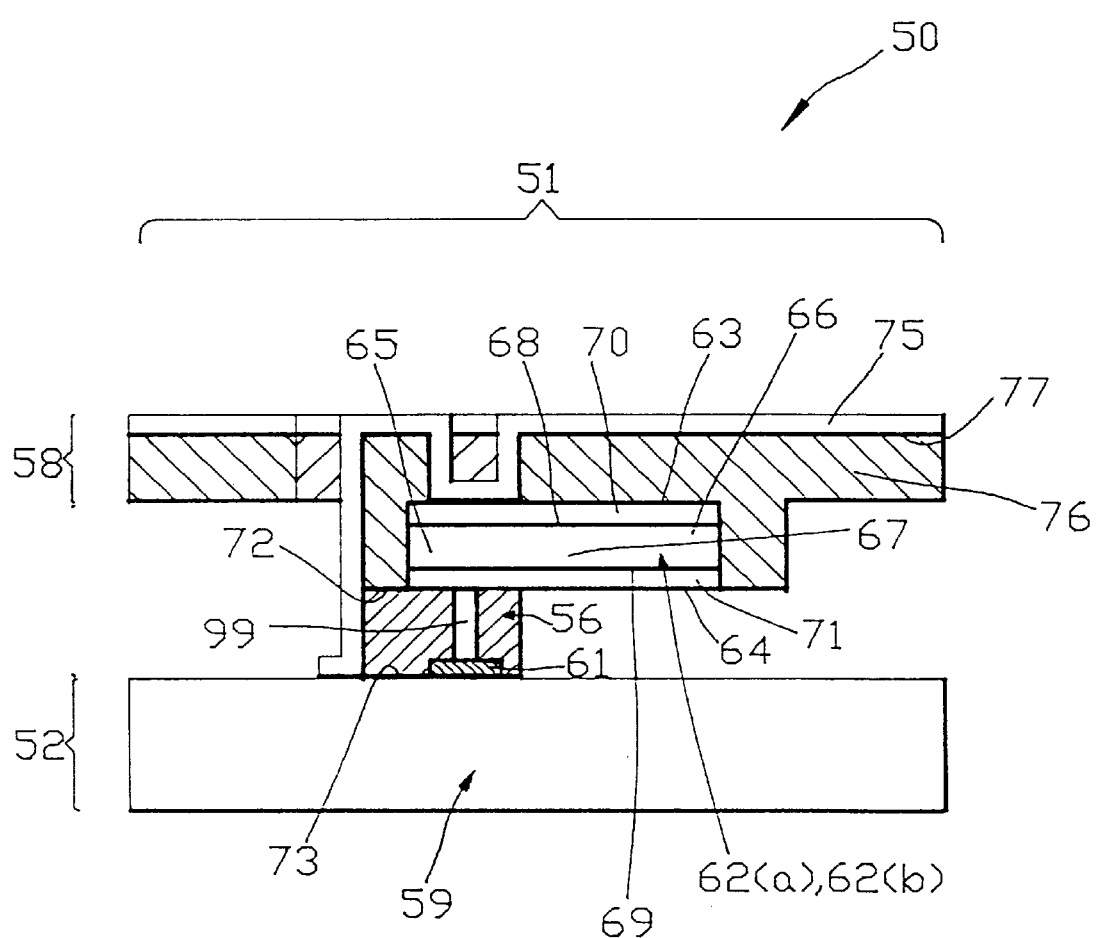
FIG. 3 illustrates a detailed cross sectional view of the inventive thin film actuated mirror array of the first embodiment, shown in FIG. 2.

FIG. 3 represents a detailed cross sectional view of the thin film actuated mirror array 50, shown in FIG. 2. The active matrix 52 includes a substrate 59, an array of M×N transistors (not shown) and an array 60 of M×N connecting terminals 61. Each of the actuating structures 54 includes identically structured first actuating and second actuating parts 62(a), 62(b), wherein each actuating part, e.g., 62(a), is provided with a top and a bottom surfaces 63, 64, a proximal and a distal ends 65, 66. Each actuating part, e.g., 62(a), further has at least a thin film layer 67 of a motion-inducing material, e.g., a piezoelectric material, an electrostrictive material or a magnetostrictive material, including a top and a bottom surface 68, 69 and a first and a second electrodes 70, 71 with the first electrode 70 being placed on the top surface 68 of the motion-inducing layer 67 and the second electrode 71, on the bottom surface 71 of the motion-inducing layer 67. In the case when the motion-inducing layer 67 is made of a piezoelectric material., e.g., lead zirconium titanate(PZT), it must be poled. The first and second electrodes are made of a metal such as gold(Au) or silver (Ag).

Each of the M×N supporting members 56, provided with a top and bottom surfaces 72, 73, is used for holding the first and the second actuating parts 62(a), 62(b) of each of the actuating structures 54 in place and also for electrically connecting the second electrode 71 in the first and second actuating parts 62(a), 62(b) in each of actuating structures 54 with the corresponding connecting terminal 61 on the active matrix 52 by being provided with a conduit 99 made of an electrically conductive material, e.g., a metal. In this inventive array 50 of M×N thin film actuated mirrors 51, each of the first and second actuating parts 62(a), 62(b) in each of the actuating structures 54 are cantilevered from each of the supporting members 56 by being mounted on the (top surface 73 of each of the supporting members 56 at the bottom surface 64 of each of the first and second actuating parts 62(a), 62(b) in each of the actuating structures 54 at the proximal end 65 thereof, and the bottom surface 74 of each of the supporting members 56 is placed on top of the active matrix 52.

Figure 4:
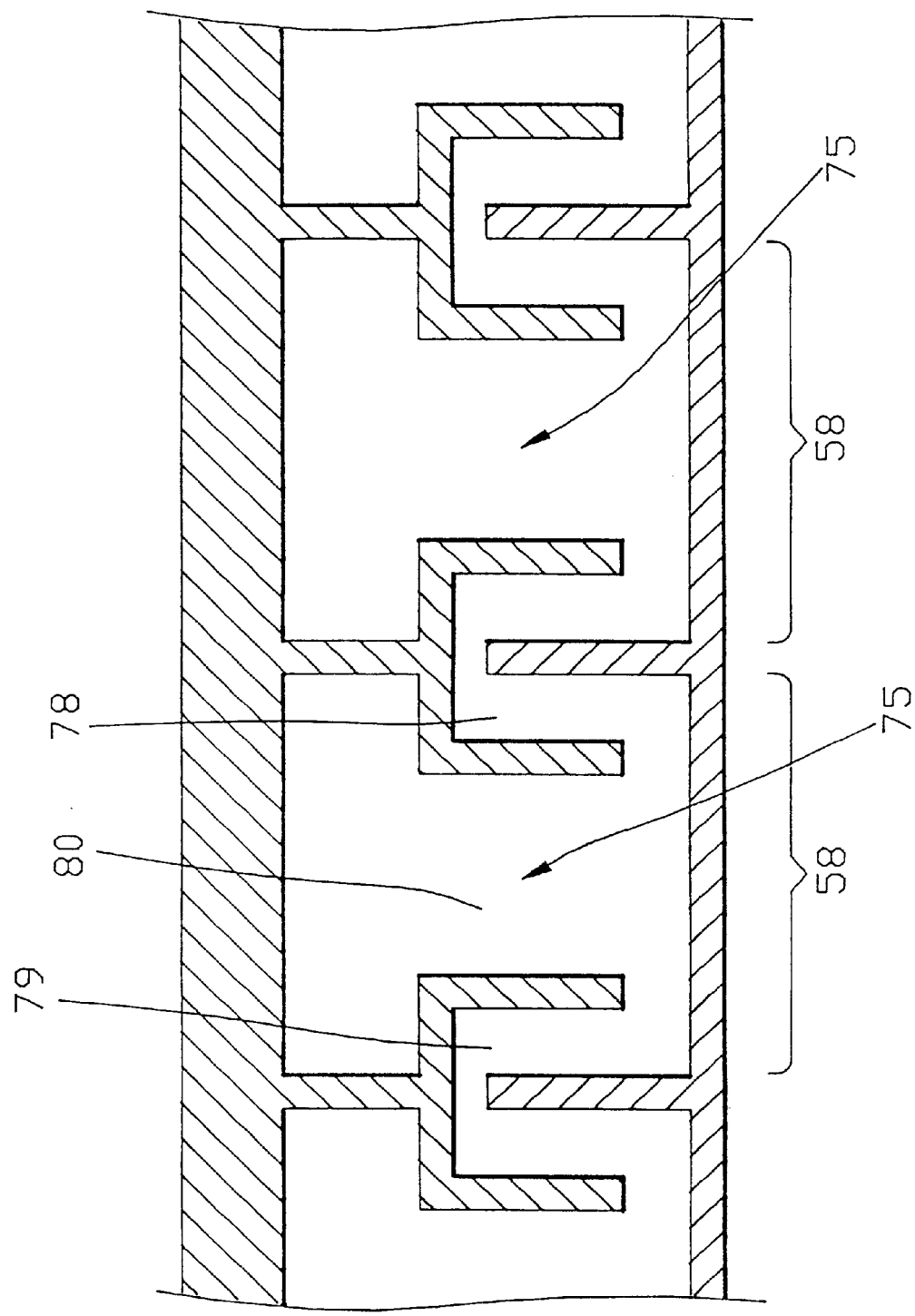
FIG. 4 depicts a top view of the inventive thin film actuated mirror array of the first embodiment, shown in FIG. 2.

Furthermore, each of the mirror layer 58, including a mirror 75 for reflecting light beams and a supporting layer 76 having a top surface 77, is provided with a first side 78, a second opposing side 79 and a center portion 80 located therebetween, as illustrated in FIG. 4. The first side 78 and the second opposing side 79 of each of the mirror layers 58 are placed on top of the first and second actuating parts 62(a), 62(b) of each of the actuating structures 54, respectively.

When an electric field is applied across the motion-inducing layer 67 between the first and second electrodes 70, 71, of each actuating parts 62(a), 62(b) in each of the actuating structures 54, the motion-inducing layer 67 thereof will deform, which will, in turn, cause a deformation of the first side 78 and second opposing sides 79 of the corresponding mirror layer 58. In such a situation, the center portion 80 of the corresponding mirror layer 58, unlike the first side 78 and the second opposing sides 79, will not deform, i.e, it will remain planar, resulting in an increased optical efficiency. In FIGS. 5 and 6, there are shown a perspective view of a thin film actuated mirror 51 of the first embodiment and another possible mirror layer configuration for the array 50 of M×N thin film actuated mirrors 51, respectively.

The material making up the supporting layer 76 in each of the mirror layers 58 can be also light reflecting, e.g., aluminum (Al), which will allow the top surface 77 thereof to function also as the mirror 75 in each of the thin film actuated mirrors 51.

It is possible for the inventive array 50 of thin film actuated mirrors 51 to function equally well by having the top and bottom surfaces 68, 69 of the motion-inducing thin film layer 67 in each of the actuating structures 54 covered completely with the first and second electrodes 70, 71 or by having either one of the top and bottom surfaces 68, 69 of the motion-inducing thin film layer 67 in each of the actuating structures 54 covered partially with the first and second electrodes 70, 71.

By way of example of the first embodiment, there are illustrated in FIGS. 3 and 7 an array 50 of M×N thin film actuated mirrors 51 comprising an array 53 of M×N actuating structures 54, made of a piezoelectric material, e.g., PZT. An electric field is applied across the piezoelectric thin film layer 67 located between the first and second electrodes 70, 71 in each of the actuating parts 62(a), 62(b) in each of the actuating structures 54. The application of the electric field will either cause the piezoelectric material to contract or expand, depending on the polarity of the electric field with respect to the poling of the piezoelectric material. If the polarity of the electric field corresponds to the polarity of the piezoelectric material, the piezoelectric material will contract. If the polarity of the electric field is opposite the polarity of the piezoelectric material, the piezoelectric material will expand.

In FIG. 7, the polarity of the piezoelectric material corresponds to the polarity of the applied electric field, causing the piezoelectric material to contract. In such a case, the first and second actuating parts 62(a), 62(b) of each of actuating structure 54 bend downward, as shown in FIG. 7, thereby tilting the first side 78 and the second opposing side 79 of the mirror layer 58 downward at an angle. The center portion 80 of the mirror layer 58, however, remains planar, and as a result, the effective length of the mirror layer 58 is the entire length of the center portion 80 of the mirror layer 58. In comparison, if the mirror layer 58 is directly secured to the actuating structure 54, the portion of the mirror layer 58 secured to the supporting member 56 does not deform in reaction to the electric field, but remains securely in place. As a result, the effective length of the mirror layer 58 is equal to a length less the length of the portion of the actuating structure 54 secured to the supporting member 56. The implementation of the first side 78, the second opposing side 79 and the first and second actuating parts 62(a), 62(b) attached thereto, respectively, in the first embodiment shown in FIG. 3, therefore, increases the fill factor and efficiency of the array 57 of mirror layers 58. Referring now to FIGS. 3 and 7, it can be shown that the light impinging on the mirror layer 58, of the actuated mirror 51 shown in FIG. 7 is deflected at a larger angle than the light reflected from of the unactuated actuated mirror 51 shown in FIG. 3.

Alternatively, an electric field of a reverse polarity may be applied across the motion-inducing thin film piezoelectric layer 67, causing the piezoelectric material to expand. In this example, the actuating structure 54 bends upward(not shown). The light impinging the mirror layer 58 of the upwardly actuated mirror 51 is deflected at a smaller angle than the light deflected from the unactuated actuated mirror 51 shown in FIG. 3.

There is shown in FIG. 8 a cross sectional view of a second embodiment of an array 100 of M×N thin film actuated mirrors 101, wherein the second embodiment is similar to the first embodiment except that each of the first and second actuating parts 62(a), 62(b) in each of the actuating structures 54 is of a bimorph structure, including a first electrode 70, a second electrode 71, an intermediate metal layers 87 an upper motion-inducing thin film layer 89 having a top and a bottom surfaces 90, 91 and a lower motion-inducing thin film layer 92 provided with a top and bottom surfaces 93, 94. In each of the actuating parts 62(a), 62(b), the upper and lower motion-inducing thin film layers 89,92 are separated by the intermediate metal layer 87, the first electrode 70 being placed on the top surface 90 of the upper motion-inducing thin film layer 89, and the second electrode 71, on the bottom surface 94 of the lower motion-inducing thin film layer 92.

As in the case of the first embodiment, the upper and lower motion-inducing thin film layers 89, 92 in each of the actuating structures 54 are made of a piezoelectric material, an electrostrictive ceramic or a magnetostrictive ceramic. In the case when the upper and lower motion-inducing thin film layers 89,92 are made of a piezoelectric material, e.g., a piezoelectric ceramic or a piezoelectric polymer, the upper and lower motion-inducing thin film layers 89,92 must be poled in such a way that the polarization direction of piezoelectric material in the upper motion-inducing thin film layer 89 is opposite from that of the lower motion-inducing thin film layer 92.

As an example of how the second embodiment functions, assume that the upper and lower motion-inducing layers 89, 90 in the array 100 of M×N thin film actuated mirrors 101 shown in FIG. 8 are made of a piezoelectric material, e.g., PZT. When an electric field is applied across each of the actuating structures 54, the upper and lower motion-inducing thin film piezoelectric layers 89, 92, of the actuating structure 54 will either bend upward or downward, depending on the poling of the piezoelectric material and the polarity of the electric field. For example, if the polarity causes the upper motion-inducing thin film piezoelectric layer 89 to contract, and the lower motion-inducing thin film piezoelectric layer 92 to expand, the actuating parts 62(a), 62(b) in each of the actuating structures 54 will bend upward. In this situation, the impinging light is deflected at a smaller angle from the actuated mirror 51 than the deflected light from the unactuated actuated mirror 51. However, if the polarity of the piezoelectric material and the electric field causes the upper motion-inducing thin film piezoelectric layer 89 to expand and the lower motion-inducing thin film piezoelectric layer 92 to contract, the actuating structure 54 will bend downward. In this situation, the impinging light is deflected at a larger angle from the actuated mirror 51 than the deflected light from the unactuated actuated mirror 51.

Figure 9:
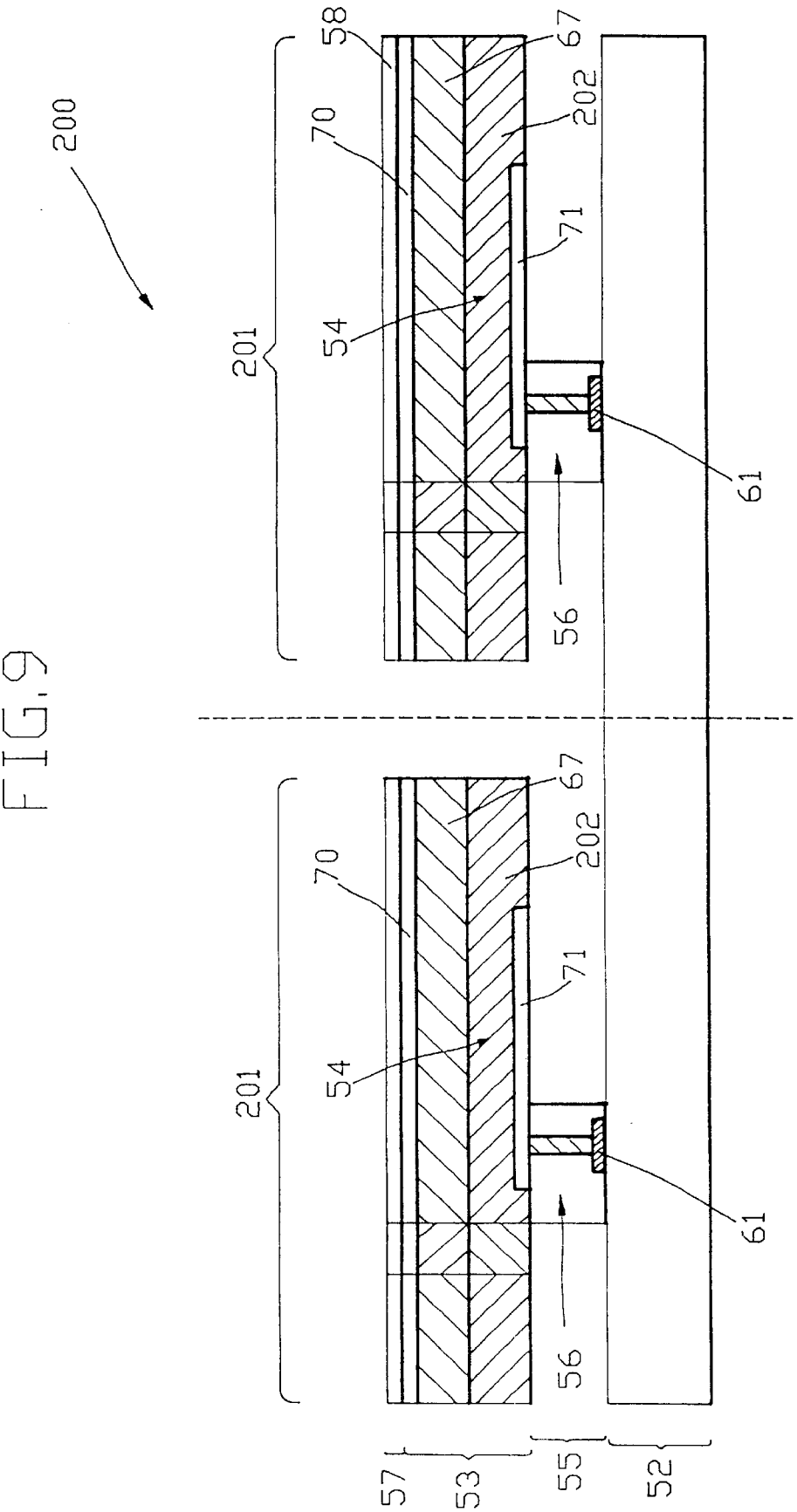
FIG. 9 is a cross sectional view of an array of M×N thin film actuated mirrors in accordance with the third preferred embodiment of the present invention.
Figure 10:
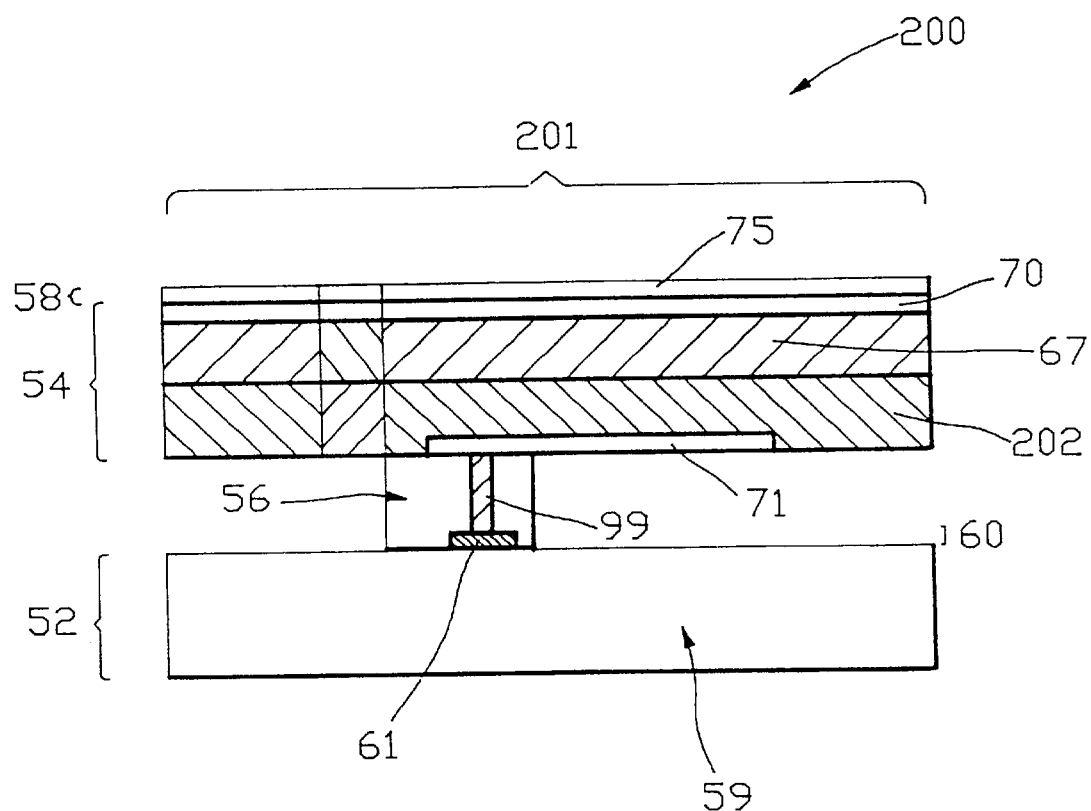
FIG. 10 displays a detailed cross sectional view of the inventive thin film actuated mirror array of the third embodiment, shown in FIG. 9.
Figure 11:
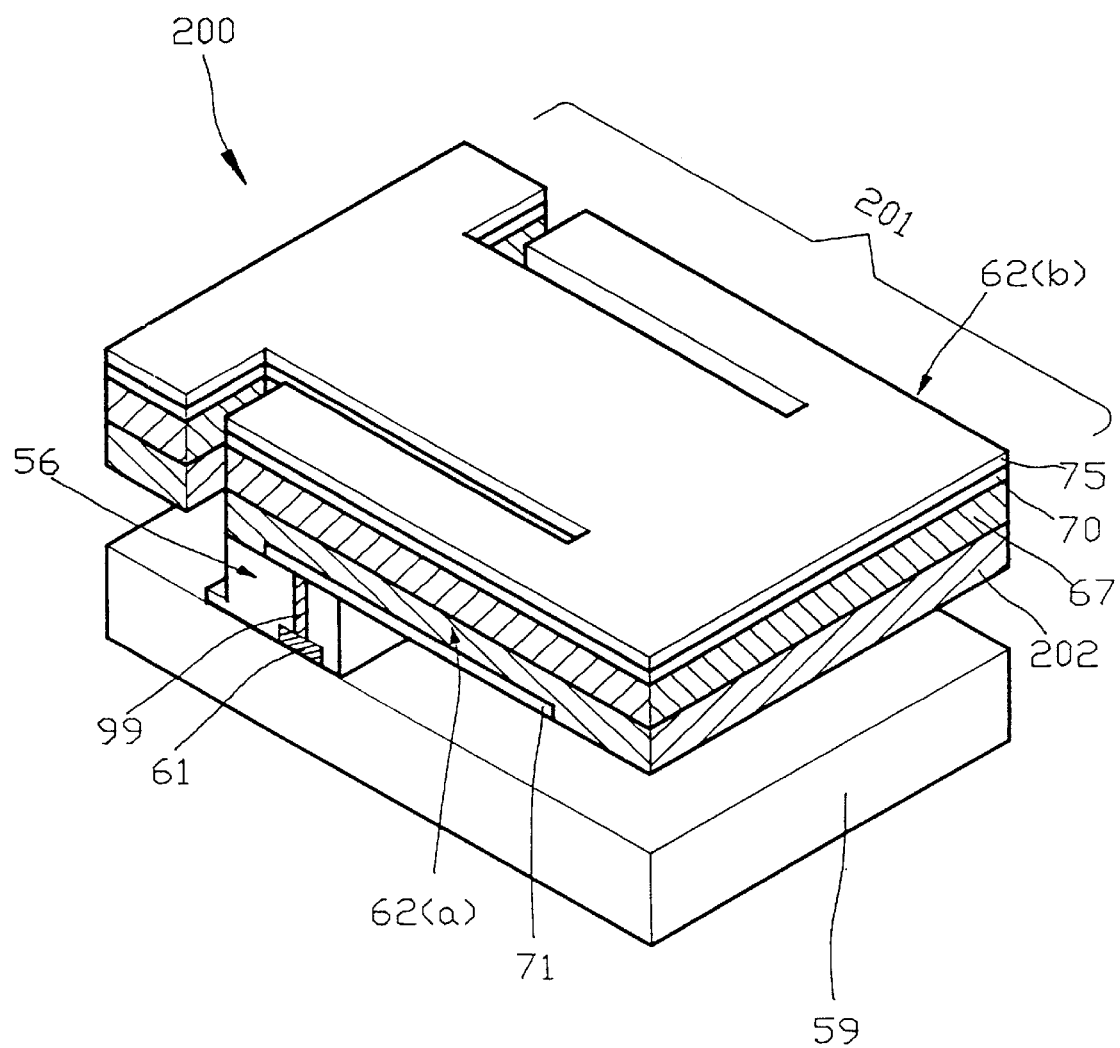
FIG. 11 describes a perspective view of the inventive thin film actuated mirror array of the third embodiment, shown in FIG. 9.

There are illustrated in FIG. 9 a schematic cross sectional view of a third embodiment of an array 200 of M×N thin film actuated mirrors 201. The third embodiment is similar to the first embodiment except that the first and second actuating parts 62(a), 62(b) of each of the actuating structures 54 lack the supporting layer 76 in the mirror layer 58. Instead, they are provided with an elastic layer 202 located on the bottom surface 69 of the motion-inducing layer 67, as shown in FIG. 10. Conventionally, when an elastic layer is provided in an actuated mirror, the motion-inducing and elastic layers are usually separated by a layer of an expensive electrically conducting metal, e.g., platinum (Pt) to improve adhesion therebetween.

However, if the thermal expansion coefficient of the materials making up the elastic layer and the motion-inducing layer is drastically different each other and the interface between the elastic layer and the electrically conductive metal layer or the interface between the motion-inducing layer and the electrically conductive layer are weak, they will lead to a peeling of the electrically conductive metal layer, thereby reducing the overall performance of the actuated mirror. A possible solution to this problem is to form the elastic and motion-inducing layers with the materials having the same structure, e.g., perovskite. Since the materials making up the elastic and motion-inducing layers are similar structurally, it will better adhesivity therebetween to thereby eliminate the need for forming of the electrically conductive metal layer and also allow an easier control of strain energy therebetween. One possible combination of the such materials are PZT for the motion-inducing layer and lead titanate(PbTiO$_3$) for the elastic layer. In this case, the material making up the elastic layer is characterized by a high dielectric constant($\epsilon$) and a low piezoelectric constant (d).

Also, if the first electrode is made of a light reflecting material. e.g., Al, the mirror layer 58 can be omitted. In such a case the first electrode will also function as the mirror layer 58.

Figure 12A:
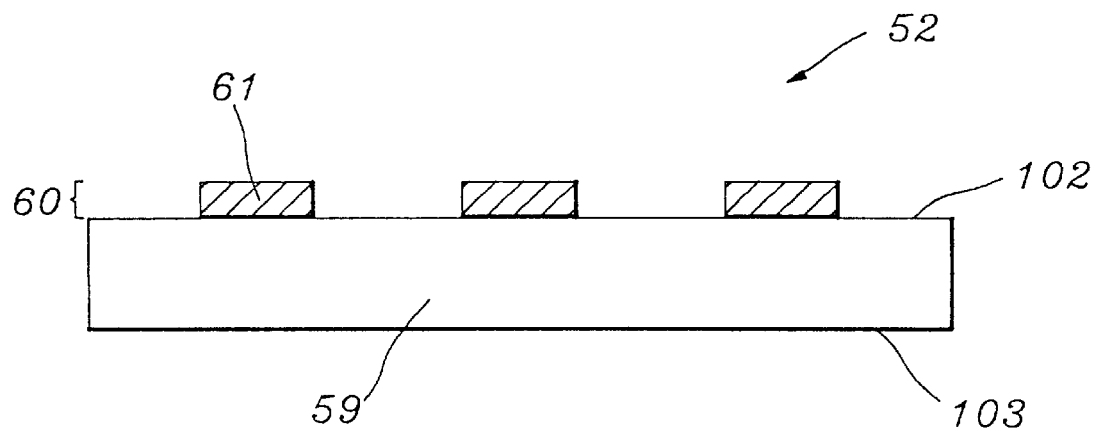
FIGS. 12A to 12J reproduce schematic cross sectional views setting forth the manufacturing steps for the first embodiment in accordance with the resent invention.

There are illustrated in FIGS. 12A to 12J the manufacturing steps involved in manufacturing of the first embodiment of the present invention. The process for manufacturing the first embodiment, i.e., the array 50 of M×N thin film actuated mirror 51, wherein M×N are integers, begins with the preparation of the active matrix 52, having the top and a bottom surfaces 102, 103, comprising the substrate 59, the array of M×N transistors (not shown) and the array 104 of M×N connecting terminals 105, as illustrated in FIG. 12A.

Figure 12B:
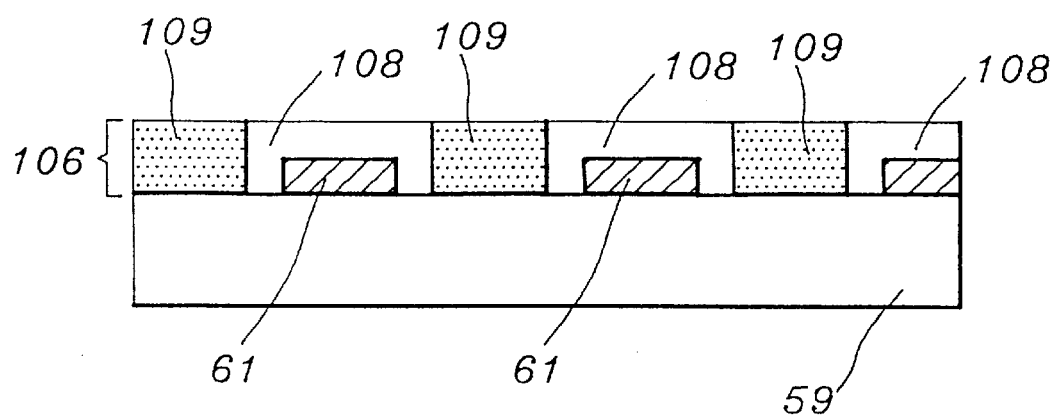

In the subsequent step, there is formed on the top surface 102 of the active matrix 52 a first supporting layer 106, including an array 107 of M×N pedestals 108 corresponding to the array 55 of M×N supporting members 56 and a first sacrificial area 109, wherein the first supporting layer 106 is formed by: depositing a first sacrificial layer (not shown) on the entirety of the top surface 102 of the active matrix 52; forming an array of M×N empty slots (not shown), to thereby generated the first sacrificial area 109, each of the empty slots being located around each of the M×N connecting terminals 61; and providing a pedestal 108 in each of the empty slots, as shown in FIG. 12B. The first sacrificial layer is formed by using a sputtering method, the array of empty slots, using an etching method, and the pedestals, using a sputtering or a chemical vapor deposition(CVD) method, followed by an etching method. The sacrificial area 109 of the first supporting layer 106 is then treated so as to be removable later using an etching method or the application of chemicals.

Figure 12C:
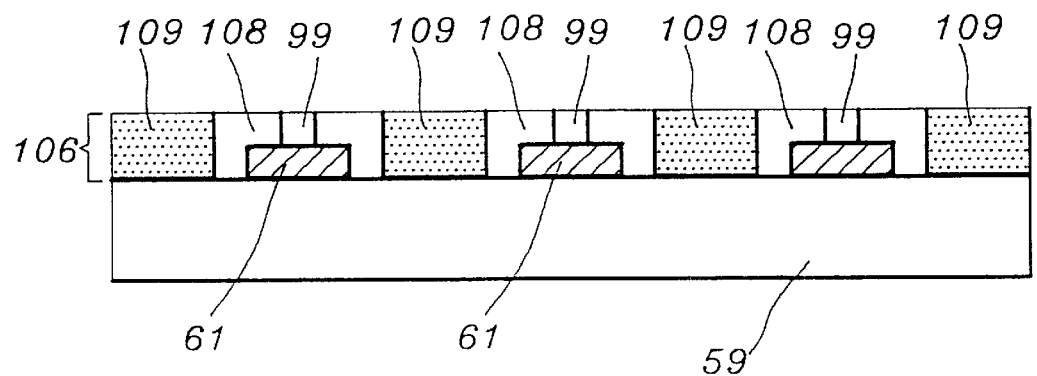

A conduit 99 for electrically connecting each of the connecting terminals 62 with each of the second electrode 71, made of an electrically conductive material, e.g., tungsten(W), is formed in each of the pedestals 108 by first creating a hole extending from top thereof to top of the corresponding connecting terminal 61 using an etching method, followed by filling therein with the electrically conducting material, as depicted in FIG. 12C.

Figure 12D:
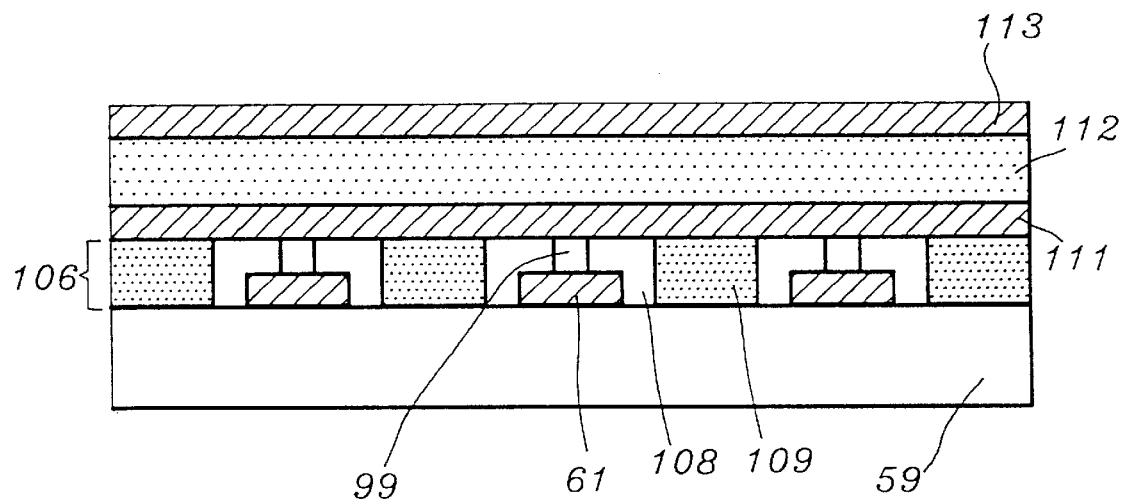

In the subsequent step, as depicted in FIG. 12D, a first thin film electrode layer 111, made of an electrically conducting material, e.g., Au, is deposited on the first supporting layer 106. Thereafter, a thin film motion-inducing layer 112, made of a motion-inducing material, e.g., PZT, and a second thin film electrode layer 113 are then formed on the first thin film electrode layer 111.

Figure 12E:
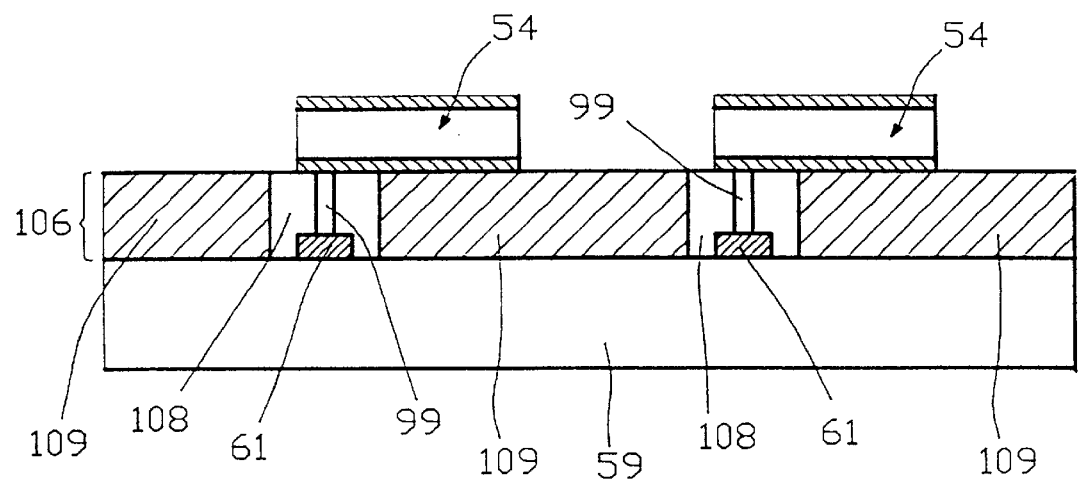

Thereafter, the first thin film electrode layer 111, the thin film motion-inducing layer 112 and the second thin film electrode layer 113 are patterned into an array 53 of M×N actuating structures 54 and an empty area(not shown) surrounding each of the actuating structures 54, wherein each of the actuating structures 54 includes the first and second actuating parts 62(a), 62(b), as shown in FIG. 12E.

Figure 12F:
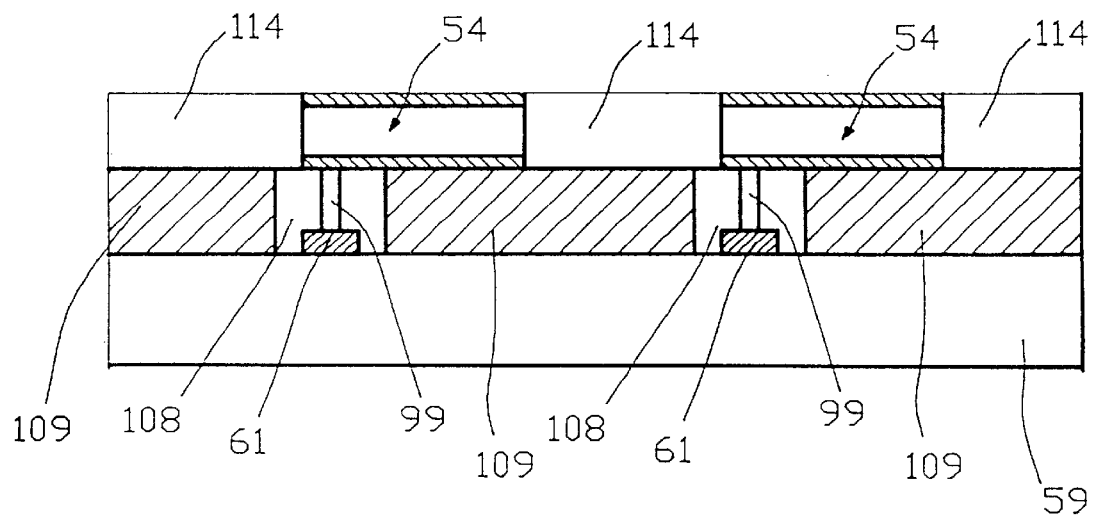

Subsequently, a second sacrificial layer 114 is formed on the empty area surrounding each of the actuating structures 54, as described in FIG. 12F. The second sacrificial layer 114 is then treated so as to be removable later.

Figure 12G:
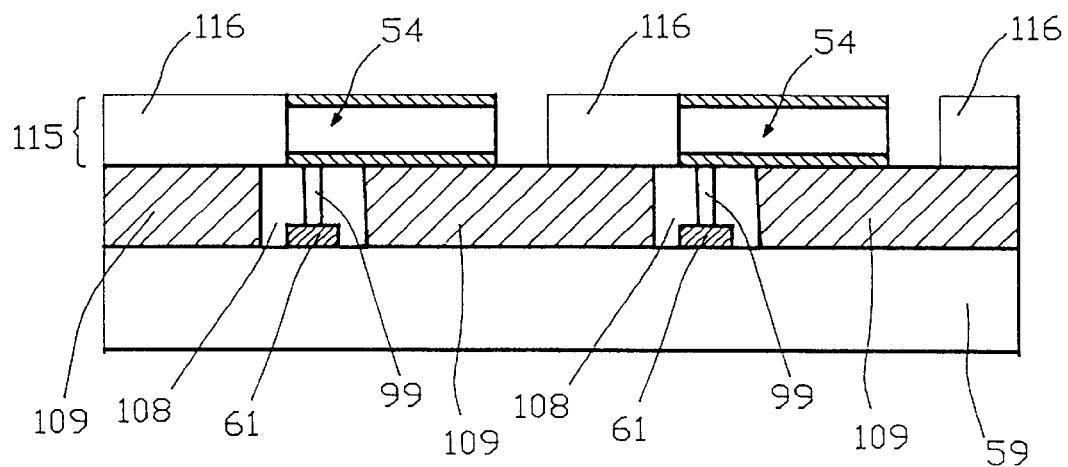
Figure 12H:
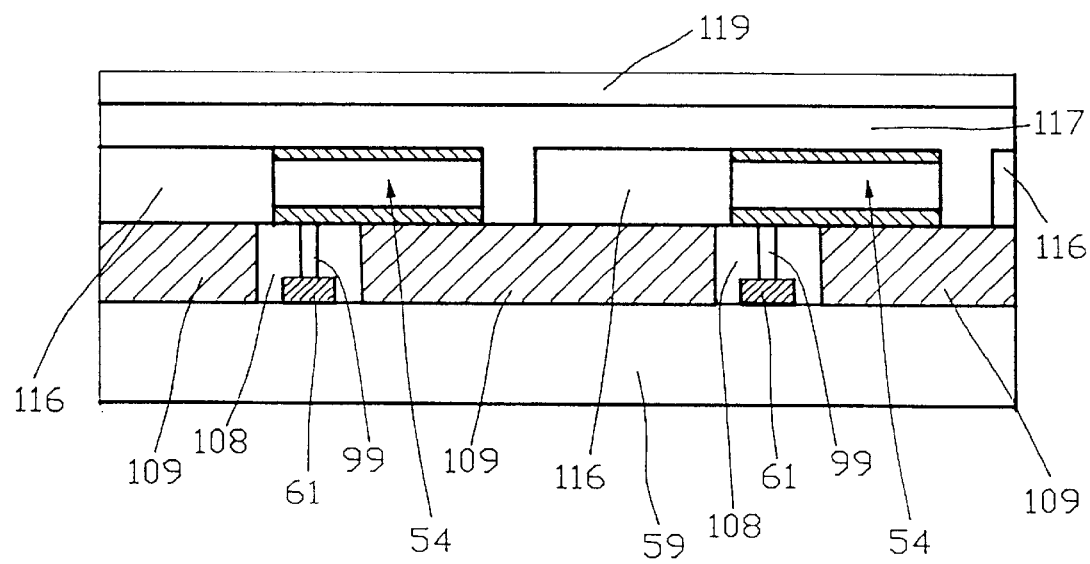

As depicted in FIG. 12G, the sacrificial layer 114 is then patterned into an array 115 of M×N sacrificial members 116. Subsequently a second supporting layer 117 and a light reflecting layer 119 comprising the mirror layer 58 are successively deposited on top of the array 53 of M×N actuating structures 54 and the second sacrificial layer 116 patterned previously, as illustrated in FIG. 12H.

Figure 12I:
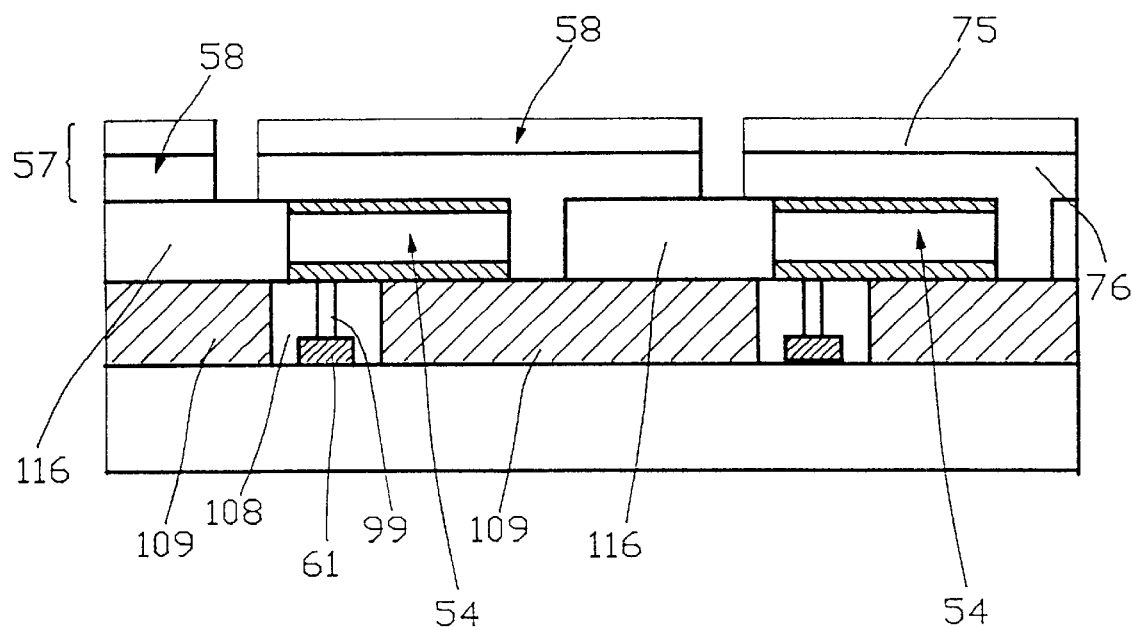

The light reflecting layer 119 and the second supporting layer 117 are then patterned into an array 57 of M×N mirror layers 58, as depicted in FIG. 12I.

The thin film layers of the electrically conducting, the motion-inducing, and the light reflecting materials may be deposited and patterned with the known thin film techniques, such as sputtering, sol-gel, evaporation, etching and micro-machining.

Figure 12J:
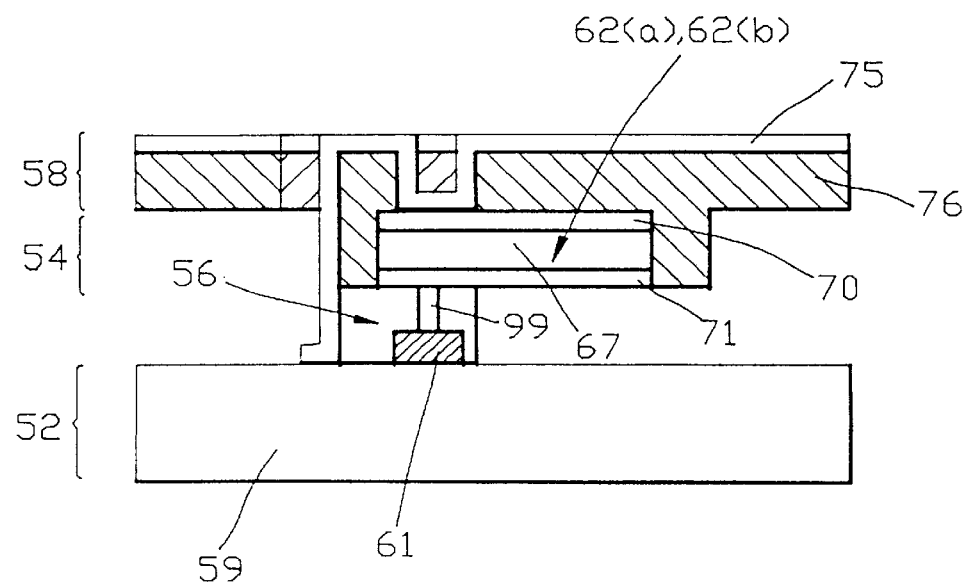

Thereafter, the first sacrificial area 109 and the array 115 of M×N sacrificial members 116 are then removed or dissolved by the application of chemical to thereby form said array 50 of M×N thin film actuated mirrors 51, as depicted in FIG. 12J.

The fabrication of the second embodiment is similar to that of the first embodiment except that it requires two additional steps, the additional steps being the formation of an additional motion-inducing layer and an intermediate metal layer.

In the case of the third embodiment, since each of the first and second actuating parts 62(a), 62(b) in each of the actuating structures 54 is provided with an elastic layer 202 on the bottom surface of the motion inducing layer 67 while missing the supporting layer 76, the manufacturing step for the third embodiment are essentially the same as those of the first embodiment with the orders being changed slightly. Furthermore, if the second electrode layer is made of a light reflecting material, e.g., Al, the step involved in forming of the light reflecting layer 119 can also be omitted form the overall manufacturing steps.

While the present invention has been described with respect to certain preferred embodiments only, other modifications and variations may be made without departing from the scope of the present invention as set forth in the following claims.

What is claimed is:

1. A method for manufacturing an actuated mirror, comprising the steps of:

forming a first sacrificial layer over a substrate;

forming a first supporting member in the first sacrificial layer;

forming an actuating structure over the first sacrificial layer and the first supporting member, wherein the actuating structure includes a first actuating part and a second opposing actuating part;

forming a mirror on the actuating parts, wherein the mirror includes a first side portion, a second side portion and a center portion located therebetween and the center portion is partially separated from the first and the second side portions by gaps; and removing the entire sacrificial layer.

2. The method of claim 1, wherein said step of forming the first sacrificial layer includes a sputtering method.

3. The method of claim 1, wherein the first supporting member is formed by:

forming a pair of holes in the first sacrificial layer;

filling said holes with an insulating material thereby forming a pair of pedestals;

forming a pair of empty slots in said pedestals; and filling the empty slots with an electrical conducting material to thereby form a pair of electrical conduits.

4. The method of claim 3, wherein said step of forming the pair of empty slots includes an etching method.

5. The method of claim 1, wherein the actuating structure is formed by:

depositing a first electrical conducting layer;

forming a motion inducing layer on top of the first electrical conducting layer;

depositing a second electrical conducting layer; and patterning said layers to form the first and the second opposing actuating parts, wherein the first and the second actuating parts are separated entirely from each other.

6. The method of claim 5, further comprising the steps of:

first forming a second sacrificial layer; and mounting a second supporting layer on the actuating parts and the second sacrificial layer before the mirror is formed.

7. The method of claim 5, wherein said step of forming a motion-inducing layer comprises:

forming a first motion-inducing layer over said first conductive layer;

forming an electrically conductive intermediate layer over said first motion-inducing layer; and forming a second motion-inducing layer over said intermediate layer.

8. The method of claim 5, wherein at least one of said step of forming a first electrically conductive layer and step of forming a second electrically conductive layer includes a sputtering process.

9. The method of claim 5, wherein said step of forming a motion-inducing layer includes a sputtering process.

10. The method of claim 5, wherein said step of forming a motion-inducing layer includes a chemical deposition process.

11. The method of claim 5, wherein said step of forming a motion-inducing layer includes a sol-gel process.

12. The method of claim 5, wherein said motion-inducing layer includes a piezoelectric material.

13. The method of claim 1, wherein said mirror layer forming step includes a sputtering process.

14. The method of claim 1, wherein the actuating structure is formed by:

forming a first electrical conducting layer including first and second opposing portions, whereby the first and the second opposing portions of the first electrical conduction layer are disconnected from each other, electrically, and positioned below the first and the second opposing actuating parts, respectively;

depositing an elastic layer;

depositing a motion inducing layer;

depositing a second electrical conducting layer; and patterning said deposited layers to form the first and the second opposing actuating parts and a center actuated part located therebetween.

15. The method of claim 14, wherein at least one of said step of forming a first electrically conductive layer and step of forming a second electrically conductive layer includes a sputtering process.

16. The method of claim 14, wherein said step of forming a motion-inducing layer includes a sputtering process.

17. The method of claim 14, wherein said step of forming a motion-inducing layer includes a chemical deposition process.

18. The method of claim 14, wherein said step of forming a motion-inducing layer includes a sol-gel process.

19. The method of claim 14, wherein said motion-inducing layer includes a piezoelectric material.

20. The method of claim 14, wherein the motion inducing layer and the elastic layers are made of structurally similar materials.

21. The method of claim 19, wherein said motion inducing layer includes a perovskite.

22. The method of claim 20, wherein said elastic layer, made of a perovskite, has a high dielectric constant ($\epsilon$) and a low piezoelectric constant (d).

* * * * *